United States Patent [19]

Maandi et al.

[11] Patent Number: 5,302,679

[45] Date of Patent: Apr. 12, 1994

[54] ANAEROBIC COMPOSITIONS WHICH EXPAND WHEN POST-CURED

[75] Inventors: Eerik Maandi, Rocky Hill; Richard D. Rich, Avon, both of Conn.

[73] Assignee: Loctite Corporation, Hartford, Conn.

[21] Appl. No.: 926,344

[22] Filed: Aug. 6, 1992

[51] Int. Cl.$^5$ .............................................. C08F 22/40
[52] U.S. Cl. ................................... 526/262; 526/204; 526/258; 526/259; 525/375
[58] Field of Search ............... 526/262, 204, 258, 259

[56] References Cited

U.S. PATENT DOCUMENTS

| | | |
|---|---|---|
| 3,988,299 | 11/1976 | Malofsky . |
| 5,124,419 | 6/1992 | Arpin .................................. 526/262 |

FOREIGN PATENT DOCUMENTS

| | | | |
|---|---|---|---|
| 0167304 | 1/1986 | European Pat. Off. ............ | 526/262 |
| 0339489 | 11/1989 | European Pat. Off. ............ | 526/262 |
| 0376444 | 7/1990 | European Pat. Off. ............ | 526/262 |
| 56-22311 | 3/1981 | Japan ................................. | 526/262 |
| 61-162509 | 7/1986 | Japan ................................. | 526/262 |
| 61-293277 | 12/1986 | Japan ................................. | 526/262 |
| 63-199710 | 8/1988 | Japan ................................. | 526/262 |
| 3-281512 | 12/1991 | Japan ................................. | 526/262 |

OTHER PUBLICATIONS

Enns, John B. et al., *Time Temperature-Transformation (TTT) Cure Diagram: Modeling the Cure Behavior of Thermosets*, 28 Journal of Applied Polymer Science 2568, (1983).

Kinkelaar, M. et al. *Volume Change in the Cure of Low Profile Unsaturated Polyester Resin*, Sampe Quarterly, Jul. 1990, at 40.

Bailey, William J., *Ring-Opening Polymerization With Expansion in Volume*, 18 ACS Polymer Preprints 17, (Mar. 1977).

Boeder, Charles W., *Anaerobic and Structural Acrylic Adhesives*, Structural Adhesives–Chemistry and Technology 217, (S. R. Hartshorn ed., New 1986).

*Primary Examiner*—Bernard Lipman
*Assistant Examiner*—N. Sarofim
*Attorney, Agent, or Firm*—Hoffmann & Baron

[57] ABSTRACT

An adhesive composition capable of post-cure expansion comprising a multifunctional methacrylate and a maleimide capable of effectuating expansion upon post-cure. A homogeneous mixture of a monomer and maleimide are subjected to a first cure heat stage wherein a rigid partially-cured plastic is formed and a post-cure heat stage to effectuate permanent expansion of the cured adhesive composition.

5 Claims, 2 Drawing Sheets

ANAEROBIC COMPOSITIONS WHICH EXPAND WHEN POST-CURED

BACKGROUND OF THE INVENTION

This invention relates to certain anaerobic adhesive and sealant compositions being capable of expanding during and as a result of post-curing. More specifically, this invention relates to adhesive compositions which are particularly useful in applications where polymerization shrinkage is problematic.

Adhesive and sealant compositions based on acrylate and methacrylate monomers polymerizable by free-radical initiation are known in the art. Likewise, anaerobic compositions are also well known in the art and are characterized by their ability to remain liquid in the presence of air, but cure to a strong adhesive bond when air is excluded, such as by assembling a mated nut and bolt to which the composition has been applied. One major drawback of both anaerobic and structural acrylic adhesives is their tendency to shrink substantially during polymerization. Such shrinkage is highly undesirable for many applications which depend on strict tolerances and which undergo or are exposed to significant stress/strain forces.

It is known that a number of factors contribute to shrinkage during polymerization. One such factor is that monomer molecules are generally located at a van der Waals' distance from one another, while in the corresponding polymerization state, the monomeric units move to within a covalent distance of one another. This change in distance brings the atoms much closer to one another in the polymer than they were in the original monomer. Other shrinkage factors can be attributed to the change in entropy in going from monomer to polymer, the free volume present in amorphous polymers, as well as the ability of the monomer and/or polymer to pack crystals if they are present in either phase. Additionally, in condensation polymerization, the shrinkage is partially related to the size of molecule that is eliminated. It is known, for example, that shrinkage with the synthesis of certain polymers can vary widely. For example, during the synthesis of nylon 6,6 the shrinkage can vary from 22% to 66% depending on the condensation reactants.

In polymerization reactions involving ring-opening, less shrinkage is generally encountered than with simple addition polymerization. This is believed to be due to the counter balancing effect of the ring which is opening and the corresponding atoms moving from a covalent distance to a near van der Waals distance. The result is that the monomer units which move from a van der Waals distance to a covalent distance during polymerization, are counter-balanced by the atoms in the opened ring moving from a covalent distance to a van der Waals distance. The result is that the bigger the ring, the closer to a true van der Waals distance is approached during ring opening and the smaller the shrinkage during overall polymerization. Attempts to polymerize monomers which had at least two rings available for opening for every new bond formed in the backbone have been made with the intention of minimizing shrinkage. For example, it has been shown that certain bicyclic materials will polymerize with either no change in volume or in some cases slight expansion, depending on the type and amount of monomer present.

However, with the exception of reports involving ring-opening polymerization reactions involving specific spiro ortho esters, shrinkage has continued to be a major problem in anaerobic and acrylic chemistry. There is a need, therefore, for adhesive compositions which will not only undergo polymerization with substantially no shrinkage, but also have the capability of controlled expansion subsequent to polymerization, thereby overcoming the disadvantages associated with the prior art compositions. The inventive compositions are able to fulfill this need and are capable of serving an enhanced role in a variety of adhesive applications where shrinkage is problematic or the need for expansion exists and the requirement for high bond strength under elevated temperatures is desirable.

SUMMARY OF THE INVENTION

The present invention provides an anaerobic adhesive and sealant composition capable of post-cure expansion in situ which results from the reaction of a partially polymerized multifunctional and preferably difunctional methacrylate monomer and a maleimide capable of effectuating permanent post-cure expansion. This composition includes a mixture of a) a monomer corresponding to the general formula

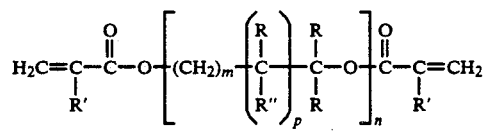

wherein R represents a radical selected from the group consisting of hydrogen, lower alkyl of 1–4 carbon atoms, hydroxy alkyl of 1–4 carbon atoms, and

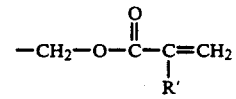

wherein R' is a radical selected from the group consisting of hydrogen, halogen, and lower alkyl of 1–4 carbon atoms; R" is a radical selected from the group consisting of hydrogen, —OH and

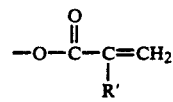

wherein m is an integer equal to at least 1, e.g., from 1 to 8 or higher, and preferably from 1 to about 4; n is an integer equal to at least 1, for example, 1 to 20 or more; and p is 0 or 1; and b) a maleimide capable of effectuating permanent post-cure expansion of said composition.

The compositions of this invention are designed to be subjected to a controlled two-step cure. Traditionally, two-step cures usually proceed via different pathways or curing mechanisms. An example of two-step curing compositions is ultraviolet light/anaerobic curing compositions. The present inventive compositions, however, differ from these in that heat curing is required in both the initial and post curing stages and a balancing of initial curing temperature and time is critical. Too much or too little polymerization in the initial cure cycle will not effectively yield the physical expansion in the final post-cured product.

While the mechanism for post-cure expansion is not entirely understood, one theoretical explanation is that during the higher temperature second curing stage the polymer chain begins to partially break down, allowing the maleimide to react and insert itself between the gaps in the polymer chain. This insertion causes an observable expansion upon post-cure as the maleimide copolymerizes with the methacrylate polymer. It is therefore critical to balance the temperature and time of the first curing stage to allow for the interaction between the residual monomer and previously formed polymer with the maleimide during the second stage. The second stage cure, i.e., the post-cure, is performed at a substantially higher temperature which effectuates copolymerization of the methacrylate and the maleimide.

As will be discussed further herein, certain maleimides do not demonstrate the ability to perform in the inventive compositions. These maleimides when reacted with the monomer did not produce post-cure expansion.

This invention also relates to a process of preparing an adhesive composition capable of post-cure expansion by subjecting a multifunctional methacrylate monomer and a maleimide capable of effectuating post-cure expansion to an initial curing stage for a time and temperature sufficient to effectuate partial polymerization of the monomer, thereby forming a rigid solid-like material; and further subjecting the material of the preceding step to a post-cure stage for a time and temperature sufficient to effectuate permanent expansion.

A method of adhesively joining parts together using the inventive compositions is also disclosed.

DETAILED DESCRIPTION OF THE INVENTION

Figure 1:
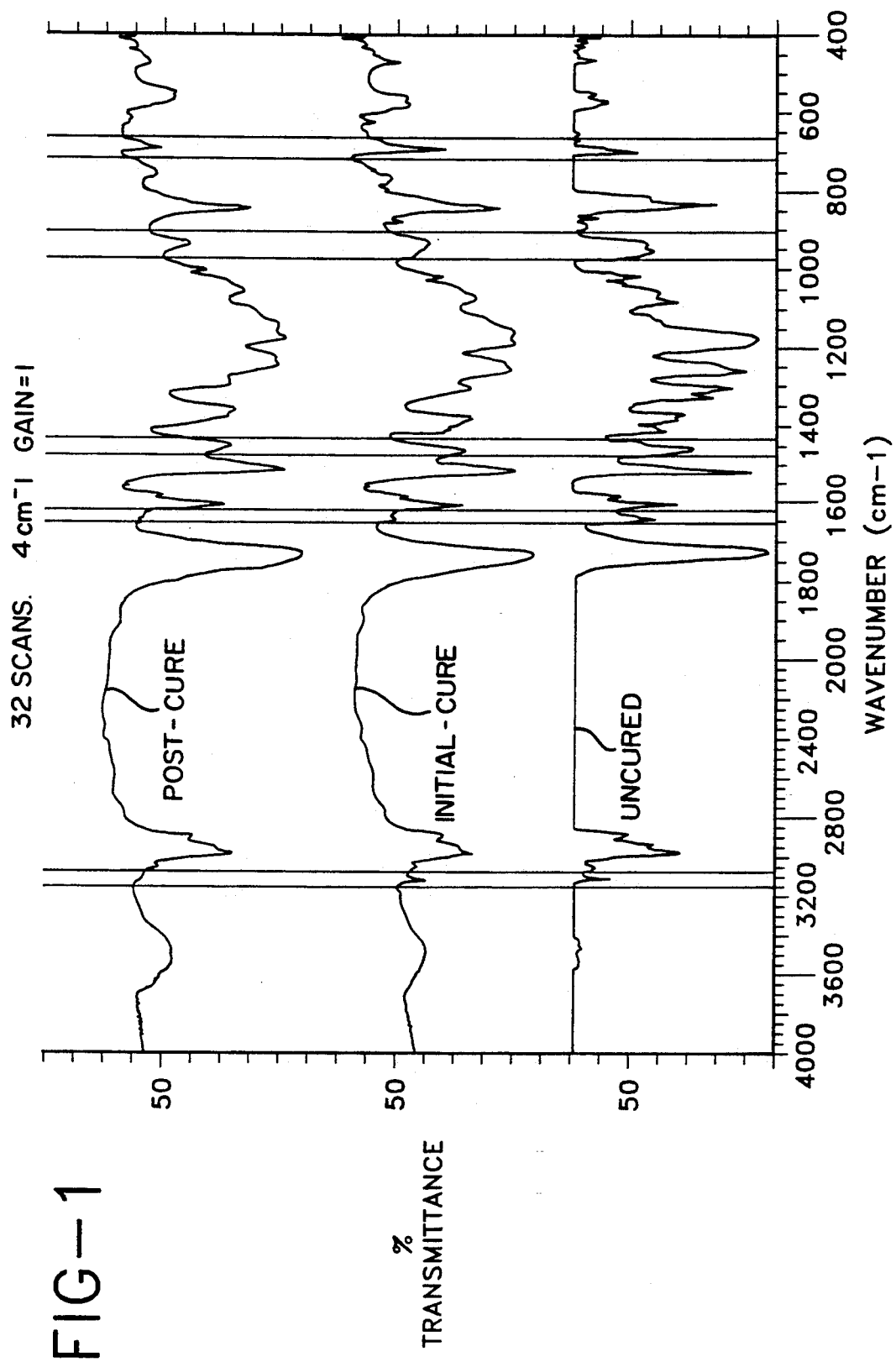
FIG. 1 shows infra red spectra of inventive Composition No. 1 in the uncured, initial- and post-cured states.
Figure 2:
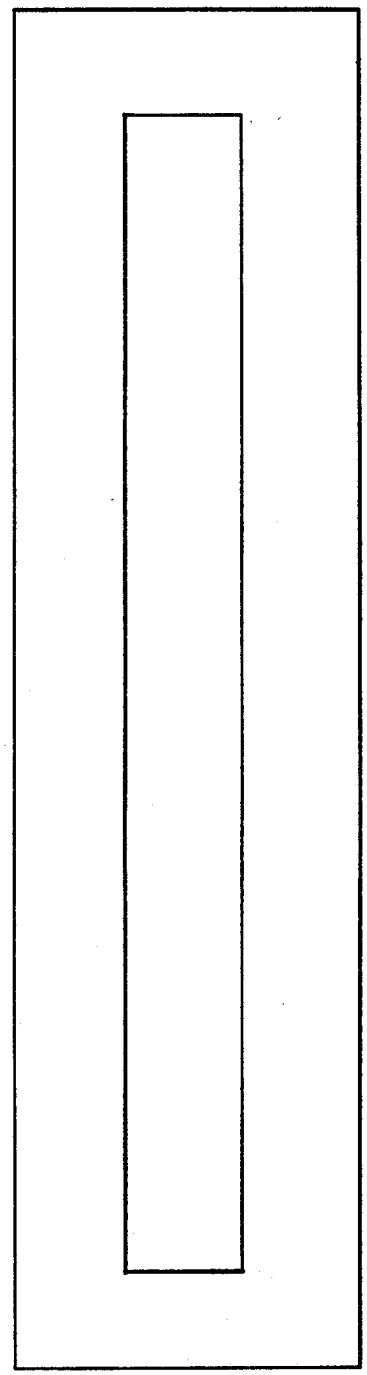
FIGS. 2. and 3 show top and side views respectively of the test bar mold used for the expansion measurements.
Figure 3:
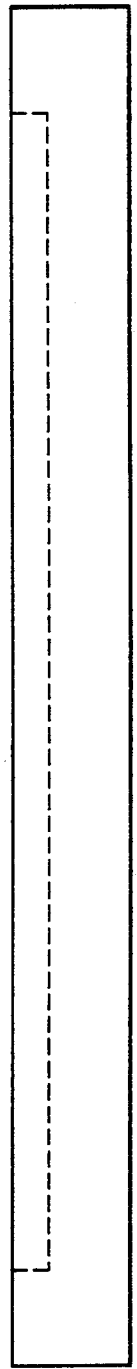

As previously mentioned, monomers which are useful in the nventive compositions include those which correspond to the following formula

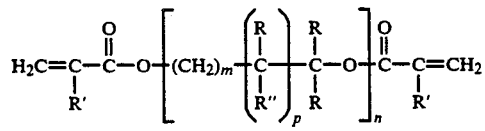

wherein R represents a radical selected from the group consisting of hydrogen, lower alkyl of 1–4 carbon atoms, hydroxy alkyl of 1–4 carbon atoms and

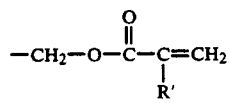

wherein R' is a radical selected from the group consisting of hydrogen, halogen and lower alkyl of 1–4 carbon atoms; R" is a radical selected from the group consisting of hydrogen, —OH and

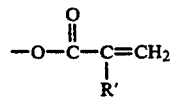

wherein m is an integer equal to at least 1; n is an integer equal to at least 1; and p is 0 or 1.

The polymerizable polyacrylate esters utilized in accordance with this invention and corresponding to the above general formula are exemplified by, but not restricted to, the following materials: diethylene glycol dimethacrylate, triethylene glycol dimethacrylate, tetraethylene glycol dimethacrylate (TEGMA), dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate and trimethylol propane triacrylate. Other acrylates, such as ethoxylated bisphenol A dimethacrylate (EBIPMA), the reaction product of the diglycidylether of bisphenol A with methacrylic acid, their related compounds and derivatives may also be used. Of these, the preferred monomer is ethoxylated bisphenol A dimethacrylate.

As previously mentioned, not all maleimides demonstrate the post-curing expansion effect when combined with the above monomers. Generally, those maleimides which are useful conform to the following formula

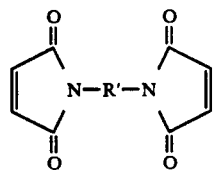

wherein R' is selected from the group consisting of alkyl, aryl, cycloalkyl, aralkyl and alkaryl. Preferably these are groups containing from about 6 to about 100 carbons and most preferably about 6 to about 50 carbon atoms. The preferred maleimide is N,N,'-m-phenylene bismaleimide.

For purposes of this invention, the term "initial cure" will refer to the first stage of producing the post-cured expansion product. During this stage, the monomer begins to polymerize. The time and temperature of polymerization during this stage can vary but should not be such that insertion of the maleimide into the polymer backbone or post-cure expansion is prevented. The reason for this is based on the previously stated theory that the maleimide will either physically or chemically insert itself into the structure of the partially polymerized monomer. Chemical analysis (FTIR) suggests the existence of some uncured monomer subsequent to the initial cure. If substantially complete polymerization were allowed to proceed at the initial stage, the resultant polymerized monomer would require significant degradation in order to incorporate the maleimide. This is not desirable since the physical properties of the adhesive composition are primarily based on the presence of a strong polymer network formed during the polymerization of the monomer. If substantially complete polymerization does occur, it may be apparent in that normally expected shrinkage will be observable.

It is therefore important to balance in the initial-cure stage both the temperature range and cure time to obtain the desired expansion properties. The lower end of the temperature should be high enough to obtain a solid material in a reasonable amount of time, which for commercial purposes is generally measured in hours and minutes rather than days. Temperatures as low as room temperature may be used, if time is not critical. In most commercial applications, however, temperatures of about 185° F. to about 212° F. have been found to be useful. The time and temperature parameters can be adjusted with the use of accelerators, discussed herein. For example, at 185° F. it takes approximately 16 hours for the composition to solidify into a rigid solid-like state. At 200° F., this condition can be reached in a shorter amount of time, e.g. 1–4 hours with the use of a metal catalyst such as copper salts.

The initial cure stage is also dependent on other factors such as percentage of monomer and maleimide present, additional additives such as catalysts, free radical initiator accelerators, plasticizers, thickeners and other ingredients conventionally added to anaerobic adhesive compositions. These conditions can be varied greatly and the limiting factor for producing the desired expansion in the initial cure stage is governed by the formation of a rigid solid-like state without complete polymerization. A specific expansion result can be achieved with appropriate experimentation.

The monomer should be present in amounts of about 60 to about 95%, preferably 70 to 95% and most preferably 75–80% by weight of the total composition. These amounts are not critical, however, and may vary outside these ranges while still obtaining the expanded effect. The amount of maleimide useful in the present invention is regulated at the lower end by whether expansion is achieved for a given amount. At the upper end, the maleimide is limited by a useful viscosity range. This is primarily due to commercialization concerns, whereby easily mixed homogeneous compositions are required. Degassing, i.e. de-aeration, may be performed if desired to ensure that the expansion is not due to foaming or air expansion but solely attributed to the chemical components in the adhesive composition. Generally the maleimide is present in amounts of about 5 to about 25% by weight. Notwithstanding this range, however, the maleimide must be present in an amount sufficient to achieve the expansion effect when combined with the aforementioned monomers.

For purposes of this invention, the term "rigid, solid-like" includes articles which are flexible. It is not intended to include articles which are rubbery in the elastomeric sense. The term "initial cure" is meant to signify the stage in which the polymer at least partially polymerizes to form the rigid solid-like state. Durometer measurements were taken of the initial-cured compositions to determine an objective physical measurement of the above term. A Shore durometer, type D-2 (0–100 scale) was used. Those which were considered rigid had values of about 75 or greater and generally between about 75 and 83. This is to be compared with values of about 69–74 for specimens which were considered unacceptable or insufficiently cured. Specimens cured in accordance with conditions which gave post-cure expansion fell within the above ranges for initial-cure durometer readings. Those which fell below that range did not yield post-cure expansion (see Table IV). Post-cure readings of the inventive compositions were about 83 or greater.

The term "post-cure" is intended to signify the second stage cure during which the physical change of expansion occurs and is permanently fixed in place. It is during this stage that the maleimide is believed to be physically and/or chemically interacting with the partially polymerized difunctional methacrylate and "inserting" itself into the polymer structure, thereby effectuating the expansion.

In practical applications involving use of the inventive compositions, it is preferred to slowly heat up the mold, or parts to be joined, to the initial curing temperature rather than attempting to quickly bring the substrates to temperature. This is to prevent inadvertent over-curing in the initial stage.

The inventive compositions also include other conventional anaerobic and polyacrylate components such as free radical initiators, free radical accelerators, inhibitors of free radical generation as well as metal catalysts.

A number of well known initiators of free radical polymerization may be incorporated in the present invention. Among those include, without limitation, hydroperoxides, such as cumene hydroperoxide (CHP), paramenthane hydroperoxide, tertiary butyl hydroperoxide (TBH) and tertiarybutyl perbenzoate. The useful amount of such peroxide compounds range from about 0.1 to about 10, preferably about 1 to about 5, percent by weight of the total composition.

Other known initiators of free radical polymerization such as saccharin and a variety of secondary and tertiary organic amines are useful in the inventive compositions. A common combination of these initiators involves a hydroperoxide, saccharin and aromatic amine system. However, in the present invention, the use of metal catalysts are preferred, alone or in combination with other conventional accelerators. The amines are often referred to as accelerators which interact with the initiator to speed the cure. These accelerators affect the cured properties of the compositions in areas of adhesion, sensitivity to oxygen, speed of cure and polymer molecular weights. Among the useful amines include amine oxides, sulfonamides and triazines.

Stabilizers and inhibitors may also be employed as well as chelating agents to control and prevent premature peroxide decomposition and polymerization. Among those useful inhibitors include phenols such as hydroquinone and quinones. Chelating agents may be used to remove trace amounts of metal contaminants. An example of a useful chelating agent is the tetrasodium salt of ethylenediamine tetraacetic acid (EDTA).

The use of accelerators may be in amounts of about 0.1 to about 5, preferably about 1 to about 2, percent by weight of the total composition. Metal catalyst solutions or pre-mixes are used in amounts of about 0.03 to about 0.1% by weight. Other agents such as thickeners, plasticizers, fillers, elastomers, thermoplastics, and other well-known additives may be incorporated where functionally desirable, provided that they do not interfere with the expansion of the cured composition.

The following examples serve to provide further appreciation of the invention but are not meant in any way to restrict the effective scope of the invention. All percentages throughout the specification and claims are by weight of the total composition unless otherwise indicated.

EXAMPLES

An example of compositions useful in the present invention are represented in Table I, below:

TABLE I

| Component | Compound | % by Wt |
|---|---|---|
| monomer | dimethacrylate ester | 60–95 |
| expansion agent | maleimide resin | 5–25 |
| initiator | cumene hydroperoxide | 1–10 |
| diluent | hydroxyalkyl methacrylate | 1–3 |
| thickener | silica, amorphous | 1–3 |
| adhesion promoter | maleic acid | 0.1–1 |
| accelerator | saccharin | 0.1–5 |
| dye(s) | green/fluorescing agent | 0.1–1.2 |
| chelator | EDTA Solution | 0.1–1.5 |

TABLE II

| Component | Compositions % by Weight 1 |
|---|---|
| EBIPMA[1] | 76.8 |
| HVA[2] | 14.6 |
| HPMA[3] | 2.3 |
| SACCHARIN | 0.35 |
| MALEIC ACID | 0.3 |
| CHP[4] | 2.35 |
| SILICA | 1.1 |
| DYE | 1.2 |
| EDTA | 1.0 |
|  | 100 |

[1]Ethoxylated bis-phenol A dimethacrylate.
[2]N,N'-m-phenylene bismaleimide.
[3]Hydroxy propyl methacrylate.
[4]Cumene hydroperoxide Composition No. 1 was formulated using conventional mixing techniques to obtain a homogeneous mixture. The mixture (100 grams) was placed in a beaker and degassed in a vacuum chamber for a time sufficient to remove any trapped air (0.5–6 hours). Subsequent to deaeration, 0.01–0.12 grams of copper catalyst solution is mixed into the formulation and the mixture is transferred into an aluminum test bar mold previously cleaned and sprayed with mold release agent. A sheet of Mylar (5 mil) is placed over the mold to cover the resin exposed to the air.

The mold containing inventive Composition No. 1 is placed in an oven and slowly heated to a temperature of about 185° to about 212° F. for the initial cure. At this stage, varying amounts of shrinkage may be observed in the test adhesive bar. The test bar is removed from the mold and placed in an oven at temperatures of about 300° to about 400° F. for the post-cure. The adhesive test bar demonstrated an increased volume as measured by the change in length and a change in appearance, changing from a translucent dark green to an opaque light green. This is believed also to be an indicator of the successful incorporation and possibly copolymerization of the maleimide with the dimethacrylate monomer backbone, since the appearance change is not present in formulations which don't exhibit expansion. The dye, however, is not believed in any way to play an active role in the expansion.

Results of experiments run with inventive Composition No. 1 are tabulated below, in Table III, showing a variety of initial and post-cure time and temperatures which may be used to obtain post-cure expansion. The percent linear change (expansion) was measured after the initial cure stage, after a first post-cure stage and after a second post-cure stage. Experiments E, G and H contained 0.081, 0.75 and 0.06% copper catalyst solution to accelerate free-radical initiation.

It is apparent from Table IV that those experiments whose shrinkage in the initial cure was smallest ($A_1$, $A_2$, E, G, H), resulted in post-cure expansion. This is indicative of the initial cure being controlled using time and temperature to prevent over-curing of the monomer which would result in the inability of the maleimide to insert itself physically and/or chemically and effectuate the expansion.

To establish that the monomer was only partially polymerized in the initial cure, Fourier Transformation Infra Red (FTIR) was run on the uncured, initially-cured and post-cured test bars, with the result that unsaturated vinyl stretching at wave number 1637.6, which is indicative of uncured monomer, was strongly present in the uncured composition, less strongly present in the initial-cured test bars and substantially absent in the post-cured test bars. Additionally, the peak at about 3100 is characteristic of the maleimide, N,N'-m-phenylene bismaleimide. This peak is present in both the uncured and initial-cured test bars, but absent in the post-cured test bars. This is evidence that the maleimide is no longer present in its original form and has likely incorporated itself into the backbone of the methacrylate polymer.

TABLE III

| | CURE CONDITIONS (°F./HRS) | |
|---|---|---|
| EXPERIMENT | Initial | Post |
| $A_1$ | 185°/16 hrs | 350°/1 hr + 350°/1 hr |
| $A_2$ | 185°/16 | 350°/1 hr + 350°/1 hr |
| B | 185°/5.5 | 350°/1 hr + 350°/1 hr |
| C | 185°/5.5 | 350°/1 hr + 350°/1 hr |
| D | 185°/5.5 | 350°/1 hr + 350°/1 hr |
| E* | 212°/1 | 350°/1 hr + 350°/1 hr |
| F | 212°/1 | 350°/1 hr + 350°/1 hr |
| G** | 212°/1 | 350°/1 hr + 350°/1 hr |
| H*** | 212°/1 | 350°/1 hr + 350°/1 hr |

*0.081% copper catalyst solution added
**0.075% copper catalyst solution added
***0.06% copper catalyst solution added

TABLE IV

| | INITIAL-CURE | | POST-CURE | | | | TOTAL EXPANSION |
|---|---|---|---|---|---|---|---|
| | | | +1 hr @350 | | +1 hr @350 | | |
| EXPERIMENT | inches | % change** | inches | % change | inches | % change | % change*** |
| $A_1$* | 11.920 | −0.667 | 12.017 | 0.814 | 12.015 | −0.017 | 0.125 |
| $A_2$* | 11.893 | −0.892 | 12.005 | 0.942 | 12.004 | −0.008 | 0.033 |
| B | 11.849 | −1.258 | 11.774 | −0.633 | 11.766 | −0.068 | −1.950 |
| C | 11.847 | −1.275 | 11.815 | −0.270 | 11.811 | −0.034 | −1.575 |
| D | 11.872 | −1.067 | 11.877 | 0.042 | 11.879 | 0.017 | −1.008 |
| E* | 11.918 | −0.683 | 12.097 | 1.502 | 12.099 | 0.017 | 0.825 |
| F | 11.816 | −1.533 | 11.809 | −0.059 | 11.806 | −0.025 | −1.617 |
| G* | 11.923 | −0.642 | 12.109 | 1.560 | 12.110 | 0.008 | 0.917 |

TABLE IV-continued

| | | | POST-CURE | | | | |
|---|---|---|---|---|---|---|---|
| TOTAL | INITIAL-CURE | | +1 hr @350 | | +1 hr @350 | | EXPANSION |
| EXPERIMENT | inches | % change** | inches | % change | inches | % change | % change*** |
| H* | 11.910 | −0.750 | 12.114 | 1.713 | 12.114 | 0.000 | 0.950 |

*initial-cure conditions produce durometer range readings (Shore D-2) of 75-83. All other Experiments (B-D, F) showed readings of about 69-74.
**Negative % indicates shrinkage. Positive % indicates shrinkage.
***% change from original uncured test bar to post-cured test bar. The original test bar mold length was 12.000 ± 0.005 inches Table V shows the effect of an initial-cure condition of 1 HRS/250° F. with and without catalysts, followed by post-cure conditions of 2 HRS/350° F. As in the preceding tables, Composition No. 1 was used for all 15 experiments. This table indicates that an initial-cure of 250° F. for 1-3 hours results in not only initial shrinkage, but over-curing of the methacrylate during the initial-cure stage, resulting in overall shrinkage during post-cure. This data further supports the need for only partially polymerized monomer in the initial-cure stage.

TABLE V

COMPOSITION NO 1
EXPANSION/SHRINKAGE TESTS

| | Initial-Cure | | | | Post-Cure | Overall |
|---|---|---|---|---|---|---|
| Experiment | 1 Hr 250 F | % Change* | +2 Hr 250 F | % Change | +2 Hr 350 F | % Change |
| | No catalyst added | | | | | |
| I | 11.910** | −0.750 | 11.804 | −0.890 | 11.930 | −0.583 |
| J | 11.891 | −0.908 | 11.810 | −0.681 | 11.951 | −0.408 |
| K | 11.874 | −1.050 | 11.736 | −1.162 | 11.805 | −1.625 |
| L | 11.874 | −1.050 | 11.750 | −1.044 | 11.844 | −1.300 |
| M | 11.883 | −0.975 | 11.767 | −0.976 | 11.870 | −1.083 |
| N | 11.956 | −0.367 | 11.880 | −0.636 | 11.901 | −0.825 |

| | Initial-Cure | | | | Post-Cure | |
|---|---|---|---|---|---|---|
| Experiment | 1 Hr 250 F | % Change | +2 Hr 250 F | % Change | +2 Hr 350 F | % Change |
| | 0.06% copper catalyst solution added | | | | | |
| O | 11.869 | −1.092 | 11.809 | −0.506 | 11.935 | −0.542 |
| P | 11.792 | −1.733 | 11.775 | −0.144 | 11.900 | −0.833 |
| Q | 11.815 | −1.542 | 11.774 | −0.347 | 11.844 | −1.300 |
| R | 11.786 | −1.783 | 11.763 | −0.195 | 11.866 | −1.117 |
| S | 11.853 | −1.225 | 11.784 | −0.582 | 11.806 | −1.617 |
| T | 11.800 | −1.667 | 11.759 | −0.347 | 11.835 | −1.375 |
| U | 11.855 | −1.208 | 11.803 | −0.439 | 11.924 | −0.633 |
| V | 11.800 | −1.667 | 11.792 | −0.068 | 11.925 | −0.625 |
| W | 11.783 | −1.808 | 11.772 | −0.093 | 11.896 | −0.867 |
| X | 11.793 | −1.725 | 11.781 | −0.102 | 11.890 | −0.917 |

*negative % indicates shrinkage. positive % indicates expansion
**measurement of test bar specimen (inches) after initial cure. Original test specimens are all 12.005" in length.

Table VI provides data for compression tests run on pins and collars in accordance with ASTMD4562. Compressive strength increased significantly upon post-cure.

TABLE VI

COMPOSITION NO. 1
COMPRESSIVE TESTS/Pins and Collars

| Test Performed | Conditions of Cure and Test | psi |
|---|---|---|
| Compressive strength initial-cure only | 1 hr. @ 212° F., tested at room temperature. | 4900 |
| Compressive strength post-cure | 1 additional hour @ 350° F., tested at room temperature. | 6800 |
| Compressive hot strength-post-cure | 1 hr. @ 212° F. + 1 hr. @ 350° F., tested at 350° F. | 4400 |
| Heat aging post-cure | 1 hr. @ 212° F. + 24 hrs @ 350° F., tested at room temperature. | 8200 |

All testing was performed on steel degreased pins and collars with 0.06% copper catalyst incorporated into the composition.

A variety of maleimides were substituted in Composition No. 1 to determine their effectiveness in producing post-cure expansion. The following maleimides did not produce expansion, but demonstrated typical shrinkage expected with compositions of the prior art. The procedure for preparing the compositions and test specimens (test bars) and taking measurements were identical to those described above. Cure conditions were the same for each composition: initial-cure of 212° F./1 HR; post-cure 350°/1 Hr.

1) Kerimid 1010

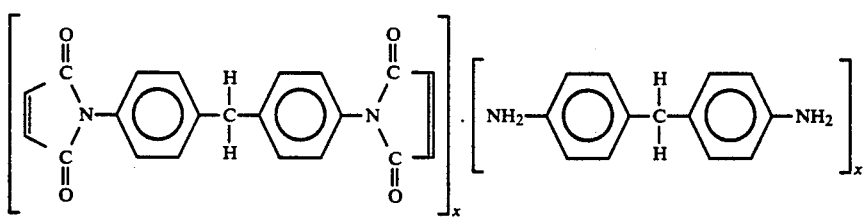

Net change in length was −2.316%, indicating shrinkage.

2) Kerimid 1050

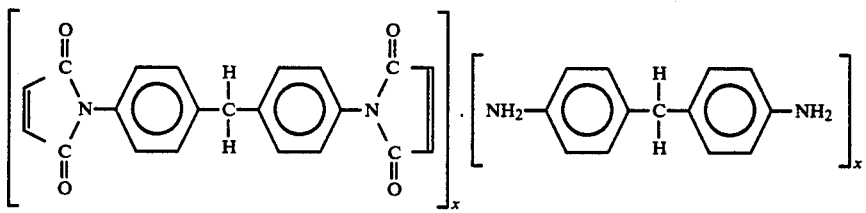

Net change in length was −1.050%, indicating shrinkage.

3) IMILEX-C

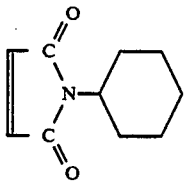

Net change in length was −1.549%, indicating shrinkage.

4) Bismaleimide M-20

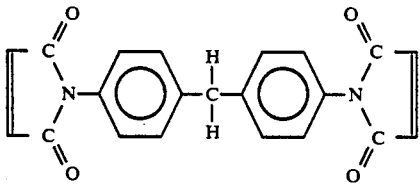

Net change in length was −1.008%, indicating shrinkage.

5) SKYBOND 3000

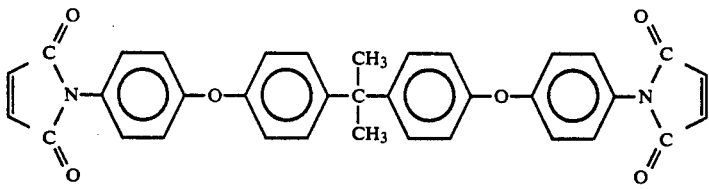

Net change in length was −0.875%, indicating shrinkage.

The invention being thus described, it will be obvious that the same may be varied in many ways. Such variations are not to be regarded as a departure from the spirit and scope of the invention and all such modifications are intended to be included within the scope of the following claims:

We claim:

1. An anaerobic adhesive composition capable of post-cure expansion in situ comprising the reaction product formed by further curing
   a) a partially polymerized difunctional methacrylate monomer and;
   b) a substantially unreacted maleimide capable of effectuating permanent post-cure expansion said maleimide having the formula

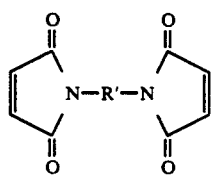

wherein R' has from 6 to 100 carbon atoms and is selected from a group consisting of alkyl, aryl, cycloalkyl, aralkyl and alkaryl, and wherein R' is not

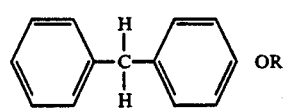 OR

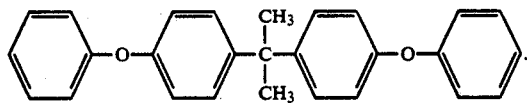

2. The composition of claim 1 wherein said partially polymerized difunctional methacrylate monomer is formed by subjecting a combination of an uncured difunctional methacrylate monomer and said maleimide to an initial heat stage for a time and temperature sufficient to obtain a substantially rigid solid-like material capable of expanding upon post-cure.

3. The composition of claim 2 wherein the monomer is selected from the group consisting of ethoxylated bisphenol A dimethacrylate, the reaction product of the diglycidyl ether of bisphenol A with methacrylic acid, and materials having the formula

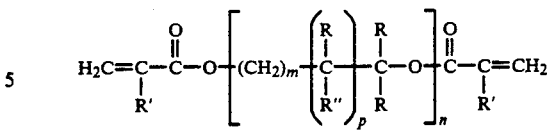

wherein R represents a radical selected from the group consisting of hydrogen, lower alkyl of 1–4 carbon atoms, hydroxy alkyl of 1–4 carbon atoms, and

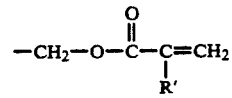

wherein R' is a radical selected from the group consisting of hydrogen, halogen, and lower alkyl of 1–4 carbon atoms; R" is a radical selected from the group consisting of hydrogen, —OH and

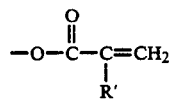

wherein m is an integer equal to at least 1; n is an integer equal to at least 1; and p is 0 or 1.

4. The composition of claim 2 wherein the initial cure takes place at a temperature range of about room temperature to 212° F.

5. The composition of claim 2 wherein the post cure takes place at a temperature range of about 300 to 400° F.

* * * * *

UNITED STATES PATENT AND TRADEMARK OFFICE
CERTIFICATE OF CORRECTION

PATENT NO. : 5,302,679
DATED : April 12, 1994
INVENTOR(S) : Maandi, et al.

It is certified that error appears in the above-indentified patent and that said Letters Patent is hereby corrected as shown below:

Abstract, line 2; column 2, line 21; column 3, lines 10, 17 and 26; column 6, line 4; column 11, line 64; column 13, lines 17 and 21, each occurrence of the term "methacrylate" should read --(meth)acrylate--.

Column 7 (Table I) line 4, "dimethacrylate" should read --di(meth)acrylate--.

In claim 1, column 11, line 64, "methacrylate" should read --(meth)acrylate--.

In claim 2, column 13, line 17, "methacrylate" should read --(meth)acrylate--.

In claim 2, column 13, line 21, "methacrylate" should read --(meth)acrylate--.

Signed and Sealed this

Fifteenth Day of August, 1995

Attest:

BRUCE LEHMAN

*Attesting Officer*  *Commissioner of Patents and Trademarks*